United States Patent
Urry

[19]

[11] Patent Number: 5,948,561
[45] Date of Patent: Sep. 7, 1999

[54] ELECTROCHEMICAL CELL AND METHOD OF ASSEMBLY

[75] Inventor: Lewis F. Urry, Elyria, Ohio

[73] Assignee: Eveready Battery Company, Inc., St. Louis, Mo.

[21] Appl. No.: 08/968,010

[22] Filed: Nov. 12, 1997

[51] Int. Cl.⁶ .................................................. H01M 2/00
[52] U.S. Cl. .................. 429/164; 429/165; 429/140; 29/623.1
[58] Field of Search ................................ 429/164–169, 429/129, 131, 132, 140, 246, 247; 29/623.1

[56] References Cited

U.S. PATENT DOCUMENTS

| | | | |
|---|---|---|---|
| 644,538 | 2/1900 | Pfannenberg | 429/164 |
| 2,605,298 | 7/1952 | Marsal . | |
| 3,196,051 | 7/1965 | Balaguer . | |
| 4,032,696 | 6/1977 | Urry | 429/165 X |
| 4,154,905 | 5/1979 | Urry | 429/165 X |
| 5,501,924 | 3/1996 | Swierbut et al. . | |
| 5,869,205 | 2/1999 | Mick et al. | 429/164 |

*Primary Examiner*—Maria Nuzzolillo
*Assistant Examiner*—Susy Tsang
*Attorney, Agent, or Firm*—Robert W. Welsh; S. Allan Fraser

[57] ABSTRACT

An electrochemical cell and method for achieving increased anode-to-cathode interface area to realize enhanced service performance are disclosed. A first electrode, such as a cathode, is provided in a container and a cavity is formed in the first electrode. A tubular separator is disposed within the cavity by inserting a conductive plate against the separator to form first and second separator compartments. The conductive plate is preferably coated with active first electrode material, such as manganese dioxide, and the plate is interference fit within the cavity. A second electrode, such as an anode, is disposed within each of the first and second separator compartments. A collector is assembled in contact with the anode and a cover and seal assembly is assembled to the top of the container.

20 Claims, 2 Drawing Sheets

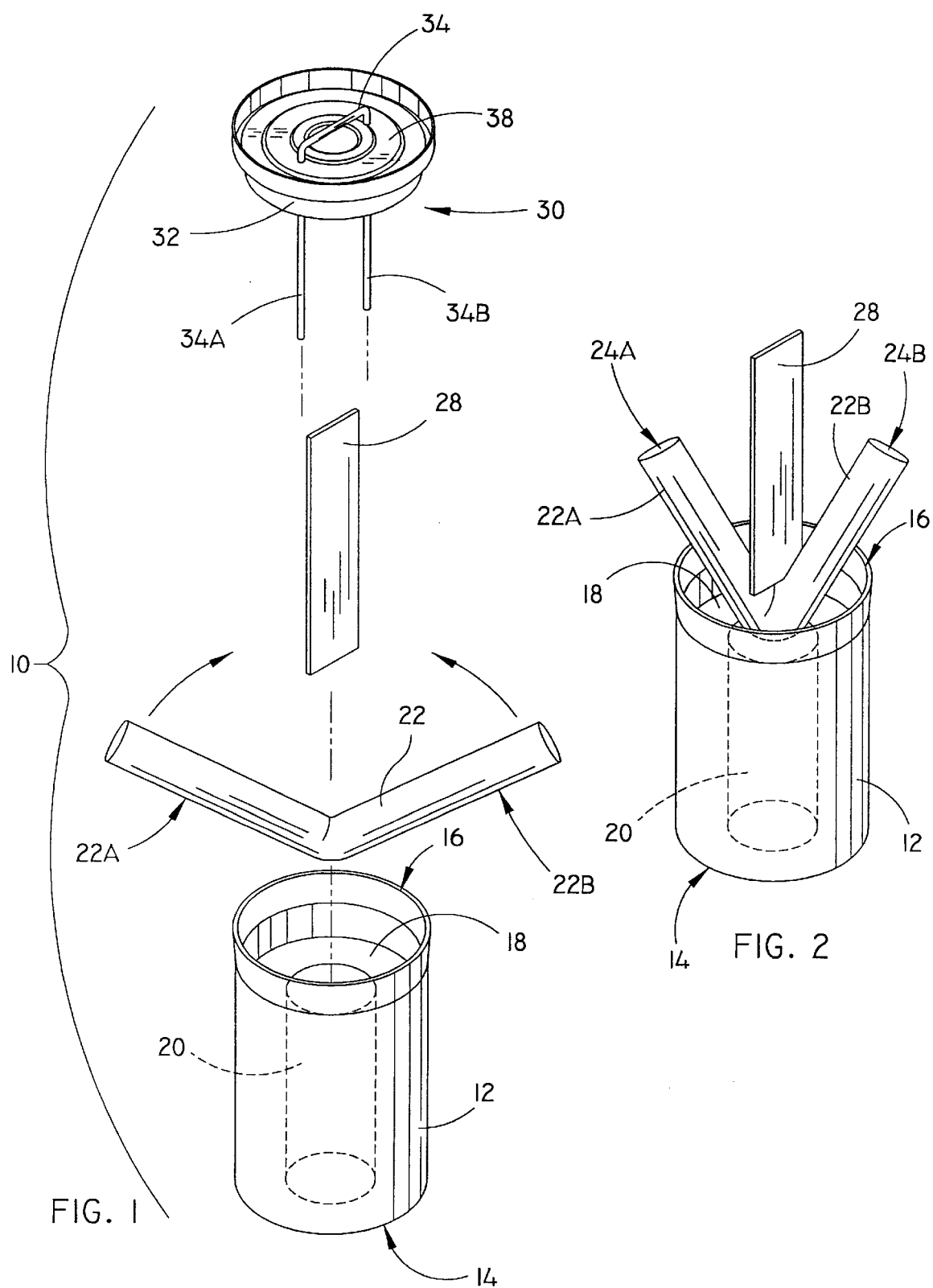

ELECTROCHEMICAL CELL AND METHOD OF ASSEMBLY

BACKGROUND OF THE INVENTION

The present invention generally relates to an electrochemical cell and, more particularly, to an electrochemical cell and method of assembling a cell having increased anode-to-cathode interface area.

Electrochemical cells are commonly employed to supply voltage for electrically operated devices, particularly for portable electrically operated devices. Currently, a number of popular alkaline cells of the generally cylindrical shape are commercially available in industry-recognized, standard sizes, including D-, C-, AA-, AAA-, and AAAA-size cells, as well as other sizes and configurations. Alkaline cells such as the aforementioned type commonly provide a predetermined open circuit voltage supply with limited service performance.

Conventional cylindrical alkaline cells generally have a cylindrically shaped steel can provided with a positive cover at one end and a negative cover at the opposite end. The cylindrical cell has a positive electrode, commonly referred to as the cathode, which is often formed of a mixture of manganese dioxide, graphite, potassium hydroxide solution, deionized water, and TEFLON® solution formed about the interior side surface of the cylindrical steel can. Typically, a cup-shaped separator is centrally disposed within an inner cylindrical volume of the can about the interior surface of the cathode. A negative electrode, commonly referred to as the anode, is typically formed of zinc powder, a gelling agent, and other additives, and is disposed with an electrolyte solution within the separator. One example of a conventional cylindrical cell is disclosed in U.S. Pat. No. 5,501,924, which is hereby incorporated by reference.

Conventional cells of the cylindrical type typically have a single anode and a single cathode assembled within the steel can with the separator interfaced therebetween. The cathode is typically disposed against the interior surface of the can, generally within an outer peripheral portion of the can, with a cylindrical cavity centrally formed in the cathode. A cup-shaped separator configured to an approximate size and shape of the cavity within the cathode is then inserted in the cavity. The separator generally has an anode-to-cathode interface generally defined by the shape and size of the anode and cathode, which is approximately equal to the surface area of the outer periphery of the cylindrical anode. In addition, the anode is generally shaped as a cylinder with a uniformly curved outer surface parallel to the container wall such that the cathode is not easily susceptible to breakage which can lead to ionic and electric discontinuity in the cell.

A primary goal in designing alkaline cells is to increase the service performance, which is the length of time for the cell to discharge under a given load to a specific voltage at which the cell is no longer useful for its intended purpose. Commercially available alkaline cells commonly have an external size that is defined by industry standards, thereby limiting the ability to increase the amount of active materials within the cell. Yet, the need to find new ways to increase service performance remains the goal of the cell designers.

SUMMARY OF THE INVENTION

The present invention enhances the performance of an electrochemical cell by providing the cell with an increased anode-to-cathode interface area to realize enhanced service performance. To achieve this and other advantages, and in accordance with the purpose of the invention as embodied and described herein, the present invention provides an electrochemical cell and method of assembling an electrochemical cell with increased anode-to-cathode interface area. A container is provided having a closed bottom end and an open top end. A first electrode is provided in the container and has a cavity formed therein. A tubular separator is disposed within the cavity such that the tubular separator is bent to form first and second compartments within the separator. A conductive plate, preferably coated with active first electrode material, such as manganese dioxide, is inserted with the separator into the cavity such that the conductive sheet is disposed between the first and second compartments. A second electrode is dispensed within the first compartment, while a third electrode is dispensed within the second compartment. A current collector is assembled in contact with the second and third electrodes, and a cover and seal assembly is assembled to the open top end of the container. According to the preferred embodiment, the first electrode comprises a cathode, while the second and third electrodes each comprises an anode.

These and other features, objects, and benefits of the invention will be recognized by those who practice the invention and by those skilled in the art, from reading the following specification and claims, together with reference to the accompanying drawings.

BRIEF DESCRIPTION OF THE DRAWINGS

In the drawings:

FIG. 1 is an exploded view of an electrochemical cell illustrating assembly of a tubular separator and conductive plate within a cavity in an electrode of the cell can;

FIG. 2 is a side view of the cell can further illustrating assembly of the tubular separator and conductive plate during assembly of the cell;

DETAILED DESCRIPTION OF THE PREFERRED EMBODIMENTS

Figure 4:
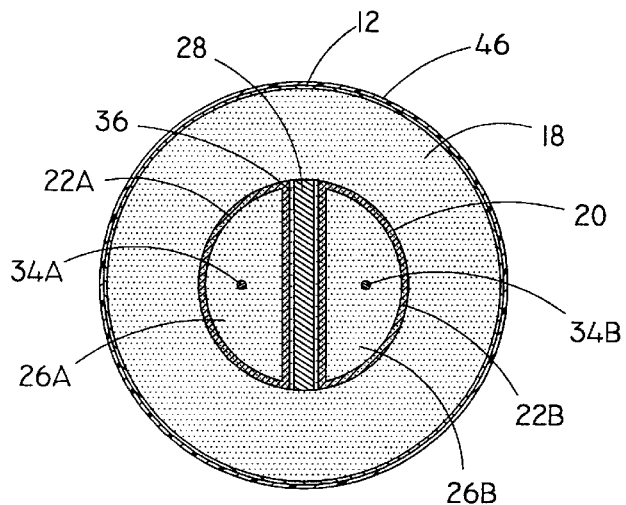
FIG. 4 is a cross-sectional view of the electrochemical cell of FIG. 3 taken on plane IV—IV.

Referring now to FIG. 1, an electrochemical cell 10 is shown having a first electrode referred to herein as a cathode, and second and third electrodes, each referred to herein as an anode. While the cathode serves as the positive electrode and the anodes serve as negative electrodes, it should be appreciated that the teachings of the present invention are not intended to be limited to the embodiments shown. In addition, while the electrochemical cell 10 is shown and described as a cylindrical alkaline cell, it should be appreciated that the principles of the present invention can also be applied to various types of electrochemical cells having various sizes and configurations.

The electrochemical cell 10, as shown in the exploded view of FIG. 1, has a cylindrical steel can 12 with a closed bottom end 14 and an open top end 16. The act of assembly of cell 10 includes disposing a cathode 18 within the interior volume of steel can 12 and forming a cylindrical anode cavity 20 within a substantially inner cylindrical volume of cathode 18. According to this arrangement, cathode 18 extends about the interior side surface of steel can 12 in the shape of a cylindrical ring. The cathode 18 is preferably formed of a mixture of manganese dioxide, graphite, potassium hydroxide solution, deionized water, and a TEFLON® suspension.

Also shown is a tubular separator 22, which is preferably formed of a non-woven fabric that prevents migration of any solid particles in the cell 10. Preferably, it has a length substantially twice the longitudinal length of the cathode 18. The tubular separator 22 may include a rolled-up sheet of non-woven fabric that is hollow with open ends. Alternatively, a one-piece tube made of regenerated cellulose may be employed with or without a paper backing. A conductive plate 28 is also shown, which is preferably made of a perforated metal. Conductive plate 28 preferably contains a coating of active cathode materials, such as manganese dioxide, that is bonded to the conductive plate 28. In addition, the coating of manganese dioxide could be mixed with conductive particles, such as graphite, to further enhance electron transfer. Accordingly, conductive plate 28 allows for electric conductivity to allow electron transfer between manganese dioxide coating and cathode 18 to enhance discharge uniformity.

With particular reference to FIG. 2, the cell 10 is further shown during assembly, according to the present invention. The assembly of cell 10 includes forcibly inserting the conductive plate 28, with manganese dioxide coating, against the mid portion of tubular separator 22 so as to cause plate 28 and separator 22 to be disposed within cylindrical cavity 20. In doing so, the conductive plate 28 causes tubular separator 22 to bend into a V-shape as it is forcefully inserted within cylindrical cavity 20. Once fully inserted, the tubular separator 22 is formed into two separators 22A and 22B having substantially semi-cylindrical anode cavities 24A and 24B, respectively, which may or may not have a joining passage at the bottom side, depending upon the length of insertion of conductive plate 28. The conductive plate 28 is preferably interference fit with cathode 18 such that plate 28 contacts the cathode 18 at opposite ends.

With the conductive plate 28 and separator 22 fully disposed within the cylindrical cavity 20, anode compartments 24A and 24B are substantially filled with anode mix. The anode materials could be injected or otherwise dispensed into separators 22A and 22B, either prior to insertion of tubular separator 22 into cavity 20 or after insertion of tubular separator 22 to form the two separators 22A and 22B. Anodes 26A and 26B may include a gel-type anode formed of non-amalgamated zinc powder, a gelling agent, and other additives, and mixed with an electrolyte solution which may be formed of potassium hydroxide, zinc oxide, and water. It should be appreciated that various types of anodes and cathodes may be employed without departing from the teachings of the present invention.

Referring briefly back to FIG. 1, an inner cover and seal assembly 30 is also shown containing a two-prong current collector 34 having a pair of current collector rods 34A and 34B. The collector rods 34A and 34B can be formed of a single conductive wire or foil that is electrically coupled to the negative terminal of the cell 10. The first current collector rod 34A is inserted into the first anode and the second current collector rod 34B is inserted into the second anode, with both rods in contact with anode zinc. Cover and seal assembly 30 further includes a seal body 32 for sealably closing the open end 16 of steel can 12. An inner metal cover 38 is disposed on top of the seal body 32. The collector rods 34A and 34B extend through passages in the inner cover 38 and the seal body 32 prevents leakage through the open end of can 12.

Figure 3:
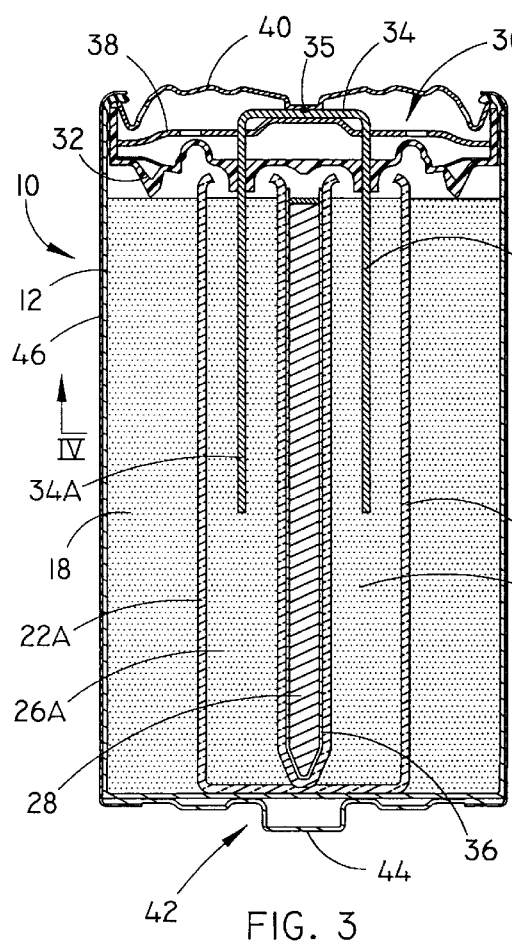
FIG. 3 is an elevational, cross-sectional view of the electrochemical cell of the present invention taken on a plane through the longitudinal axis thereof.
Figure 5:
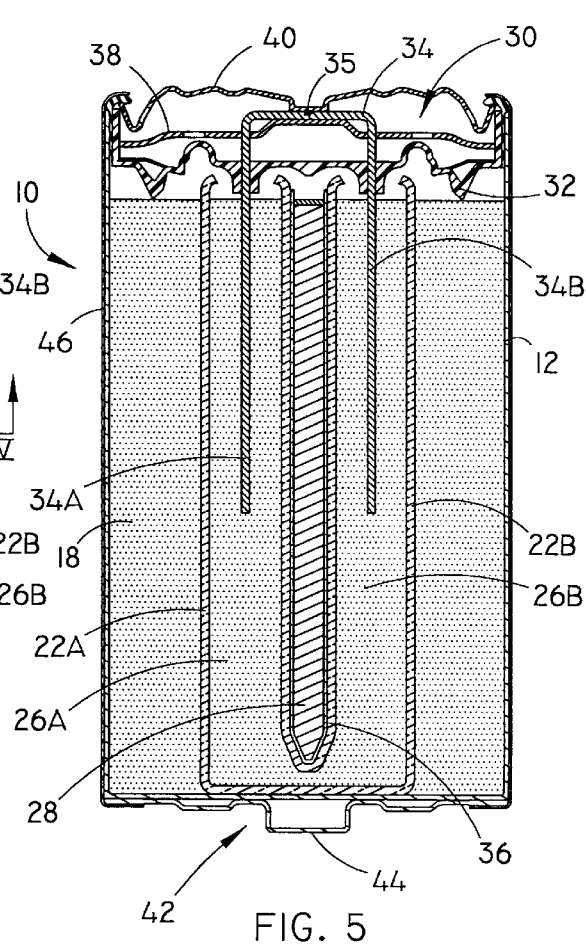
FIG. 5 is an elevational, cross-sectional view of an electrochemical cell according to another embodiment of the present invention and taken on a plane through the longitudinal axis thereof.

Referring to FIG. 3, a cross section of the fully assembled electrochemical cell 10 is shown. In addition to the cover and seal assembly 30 sealingly disposed in the open end 16, an outer contact cover 40 is disposed on top thereof to form the negative contact terminal of cell 10. The outer contact cover 40 is in contact with the top surface of current collector 34 and may be connected thereto via a spot weld 35. Assembled to the closed end of steel can 12 with outer surface 40 is a positive cover 42 preferably formed of plated steel with a protruding nub 44 at its center region, which forms the positive contact terminal of cell 10.

As shown in the cross-sectional view of FIG. 4, the first anode 26A and corresponding separator 22A, as well as the second anode 26B and corresponding separator 22B, are each formed into a substantially semi-cylindrical configuration with a semi-circular radial cross section defined by the inner surface of cathode 18 and side surface of manganese dioxide-coated conductive plate 28. The conductive plate 28 is interference fit such that it extends in contact with cathode 18 along its side edge walls. Accordingly, the conductivity of conductive plate 28 allows electrical conductivity from electrically conductive material, such as graphite, found in the cathode 18 to pass along plate 28 and to the manganese dioxide coating 36 that faces the flat surface of separators 22A and 22B. This allows for the manganese dioxide in cathode 18 to charge the coated manganese dioxide on separator plate 28 and therefore realize substantially uniform discharge.

According to an alternate embodiment of the present invention, the electrochemical cell 10 is assembled as set forth above, except the conductive plate 28 is foreshortened and therefore does not extend fully to the bottom closed end 14 of steel can 12. According to this embodiment, the first and second anodes 26A and 26B are interconnected via a passage on the bottom end below conductive plate 28 and extending above closed bottom end 14 of steel can 12. With this alternate embodiment, a single anode is provided, while realizing an enlarged anode-to-cathode interface area.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The embodiments of the invention in which an exclusive property or privilege is claimed are defined as follows:

1. A method of manufacturing an electrochemical cell comprising:

providing a container having a closed bottom end and an open top end;

providing a first electrode within said container and having a cavity formed in said first electrode;

disposing a tubular separator within said cavity such that said tubular separator is bent to form first and second separator compartments within said separator;

disposing active first electrode material between said first and second separator compartments;

dispensing a second electrode in said first separator compartment;

dispensing a third electrode in said second separator compartment;

assembling a current collector in contact with said second and third electrodes; and assembling a cover and seal assembly to said open top end of said containers.

2. The method as defined in claim 1, further comprising the step of disposing a conductive plate against a mid portion of said tubular separator and forcing said tubular separator within said cavity and between said first and second separator compartments with said conductive plate.

3. The method as defined in claim 2, further comprising the step of coating said conductive plate with said active first electrode material.

4. The method as defined in claim 2, wherein said step of disposing said conductive plate forcibly disposes said tubular separator into said cavity.

5. The method as defined in claim 1, further comprising providing said first electrode as a cathode.

6. The method as defined in claim 1, further comprising the step of providing said second and third electrodes as first and second anodes, respectively.

7. The method as defined in claim 1, further comprising the step of forming said cavity within a cylindrical volume of said first electrode.

8. The method as defined in claim 1, wherein said container comprises a substantially cylindrical can.

9. A method of manufacturing an electrochemical cell comprising the steps of:

provided a container having a closed bottom end and an open top end;

providing a cathode within said container and having a cylindrical cavity formed in said cathode;

disposing a tubular separator within said cavity such that said tubular separator is bent to form first a nd second anode compartments;

disposing a conductive plate against a mid portion of said tubular separator so that said conductive plate inserts said tubular separator within said cavity and is disposed between said first and second anode compartments of said separator;

dispensing a first anode in said first anode compartment;

dispensing a second anode in said second anode compartment;

assembling a current collector in contact with said first and second anodes; and assembling a cover and seal assembly to said open top end of said container.

10. The method as defined in claim 9, further comprising the step of coating said conductive plate with said active cathode material.

11. The method as defined in claim 10, wherein said active cathode material includes manganese dioxide.

12. An electrochemical cell comprising:

a container having a closed bottom end and an open top end;

a first electrode disposed within said container and having a cavity formed therein;

a tubular separator disposed within said cavity such that said tubular separator is bent to form first and second separator compartments within said separator;

active first electrode material disposed between said first and second separator compartments;

a second electrode dispensed within said first separator compartment of said separator;

a third electrode dispensed within said second separator compartment of said separator;

a current collector in contact with said second and third electrodes; and a cover and seal assembly assembled to said open top end of said container.

13. The cell as defined in claim 12, further comprising a conductive plate disposed within said cavity between said first and second electrode compartments of said separator.

14. The cell as defined in claim 13, wherein said conductive plate has a coating of said active first electrode material.

15. The cell as defined in claim 12, wherein said first electrode is configured as a cathode.

16. The cell as defined in claim 12, wherein said second and third electrodes are defined as first and second anodes, respectively.

17. The cell as defined in claim 12, wherein said cavity has a cylindrical volume and is located at a central region of said container.

18. The cell as defined in claim 12, wherein said container comprises a substantially cylindrical can.

19. An electrochemical cell comprising:

a container having a closed bottom end and an open top end;

a cathode disposed within said container and having a cavity formed therein;

a tubular separator disposed within said cavity such that said tubular separator is bent to form first and second anode compartments within said separator;

a conductive plate having active cathode material contained therein, said conductive plate disposed between said first and second anode compartments;

a first anode dispensed within said first anode compartment of said separator;

a second anode dispensed within said second anode compartment of said separator;

a current collector in contact with said first and second anodes; and a cover and seal assembly assembled to said open top end of said container.

20. The cell as defined in claim 19, wherein said conductive plate is interference fit against said cathode.

* * * * *